Feb. 20, 1934.  W. M. BAILEY  1,947,453
VALVE PLATE AND METHOD OF MAKING IT
Filed July 31, 1931   4 Sheets-Sheet 1

INVENTOR
William M. Bailey
By Green & McCallister
His Attorneys

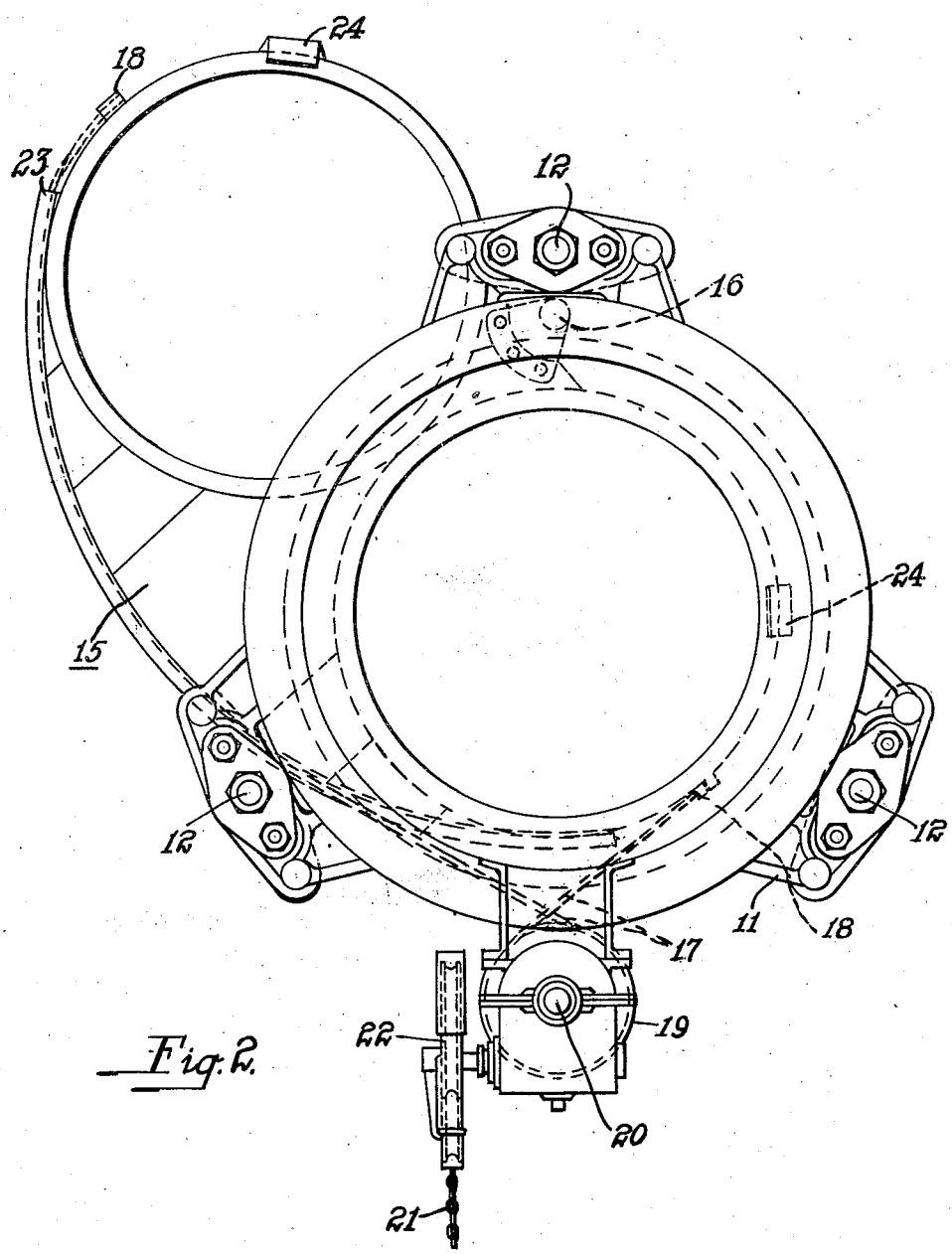

Feb. 20, 1934.　　　W. M. BAILEY　　　1,947,453
VALVE PLATE AND METHOD OF MAKING IT
Filed July 31, 1931　　　4 Sheets-Sheet 3
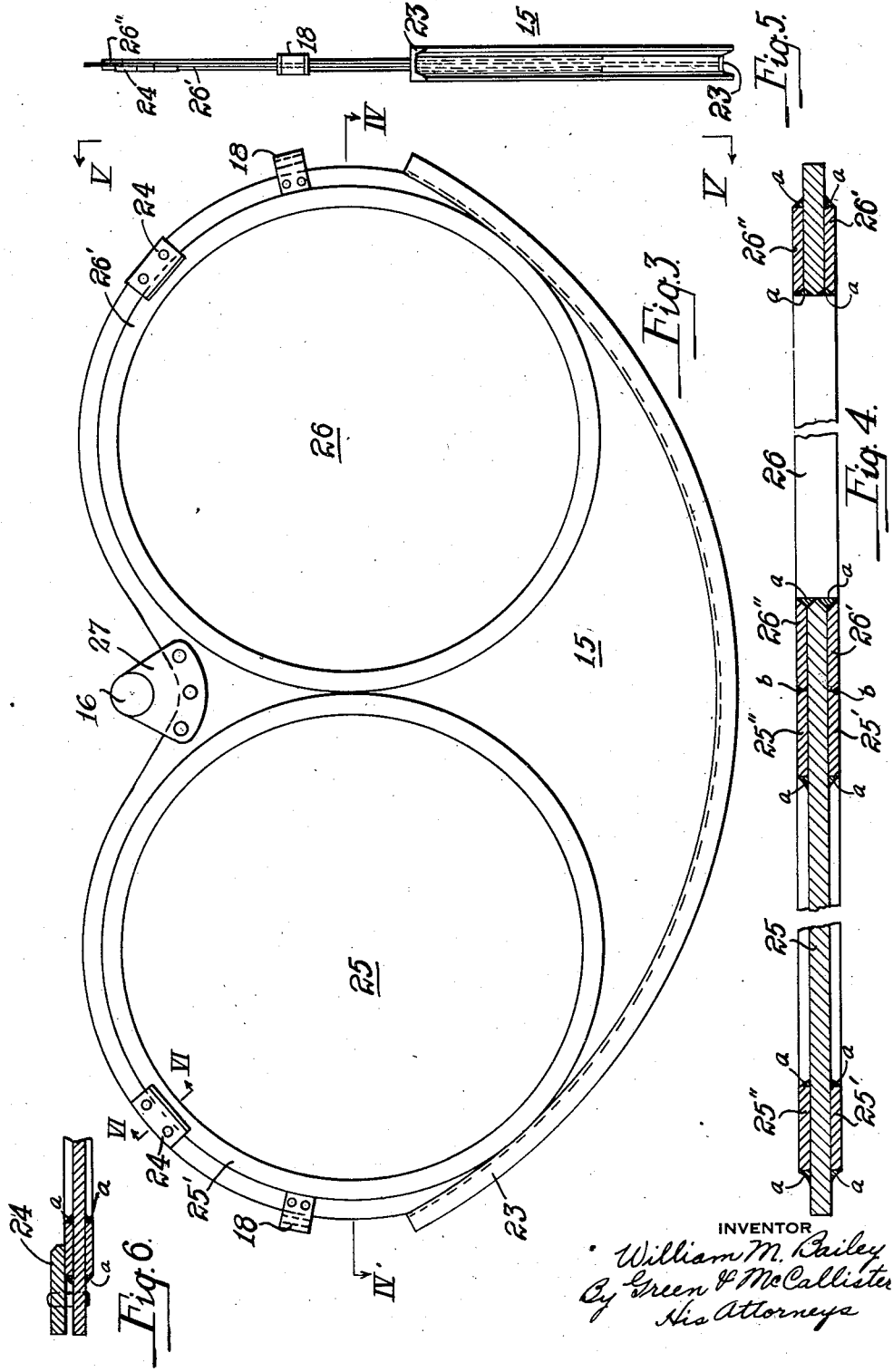

Feb. 20, 1934. W. M. BAILEY 1,947,453
VALVE PLATE AND METHOD OF MAKING IT
Filed July 31, 1931 4 Sheets-Sheet 4
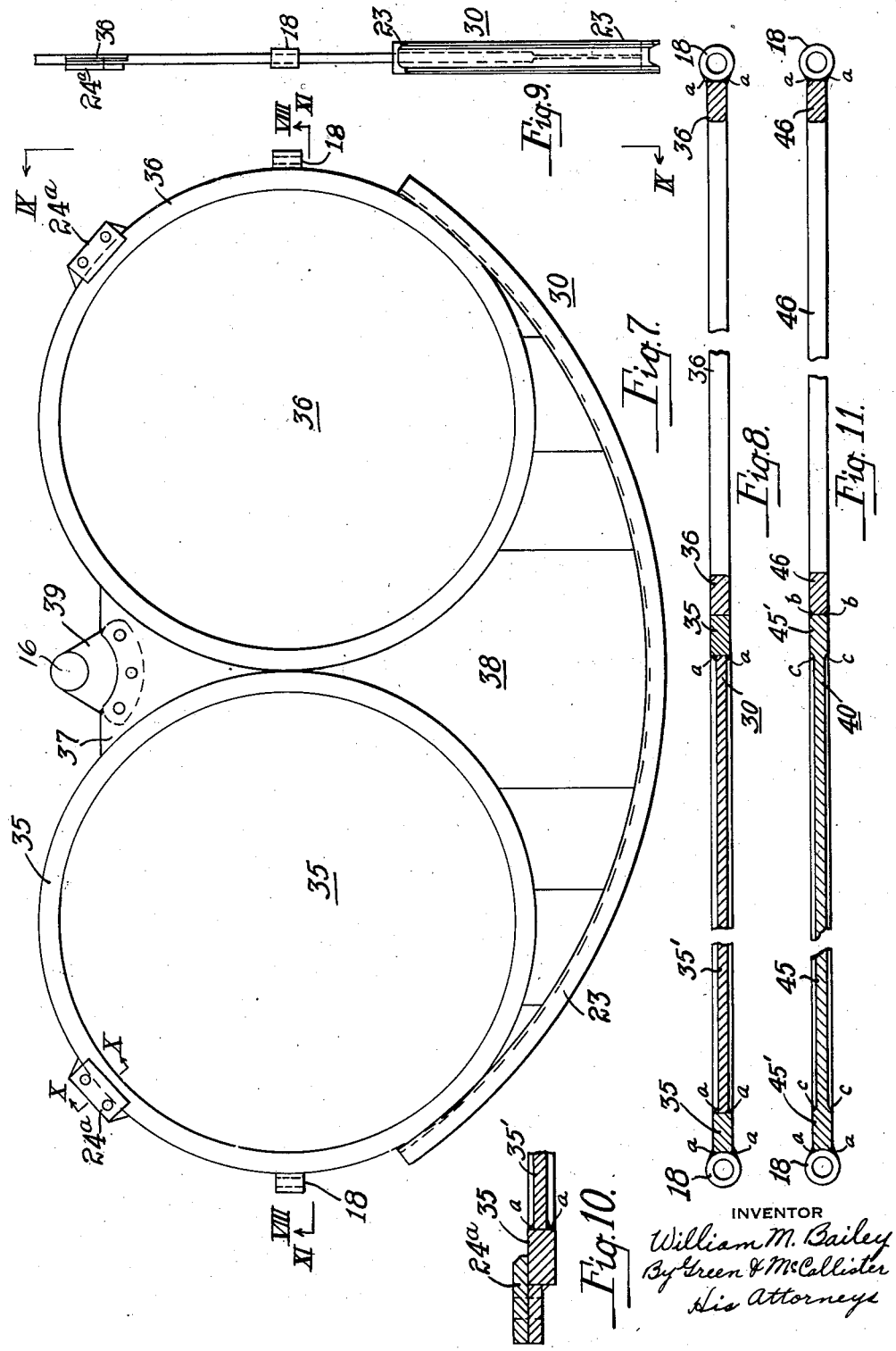
INVENTOR
William M. Bailey
By Green & McCallister
His Attorneys Patented Feb. 20, 1934

1,947,453

UNITED STATES PATENT OFFICE 1,947,453

VALVE PLATE AND METHOD OF MAKING IT

William M. Bailey, Pittsburgh, Pa.

Application July 31, 1931. Serial No. 554,179

25 Claims. (Cl. 29—157.1)

This invention relates to valves and to shut-off plates thereof, and more particularly, to goggle valve plates.

Previous to my invention, plates for goggle valves have been cut from a solid piece of metal of certain thickness. But, the fabrication of a plate of this kind involves many difficulties. Even after the most careful rolling, minute variations subsist from the center to the outside edge in the surface and thickness of a finished plate; accumulated scale, dirt, and scratches, also, paths of wear produced by continual opening and closing, all lead to an uneven and non-uniform surface which in turn, causes a leaky valve.

It has been found practically impossible to machine a seat on both sides of such a plate; and, as a result, it is a very difficult matter to obtain a gas-tight valve, particularly, since the seats of the valve flanges preferably have a machined edge for contacting with the plate.

Another serious problem is also presented, especially where large size plates are required, due to their tendency to warp when subjected to temperature variations. Although this tendency can be, to some extent ameliorated by a judicious choice of metals, yet, nevertheless, the problem is in no manner solved thereby. Even in a new plate, the variation in thickness when rolled will be too great; and, it requires a very closely-watched, sensitively-controlled process to produce a plate that will even work in a goggle valve.

Thus, it is seen that at the present time the thickness of the plate must be small in order to keep the weight down. The first as well as the maintenance costs are also prohibitative, the latter, chiefly because of the short life of the plate and the non-replaceability of the portions thereof subjected to the greatest heat and to the most wear.

And, with these manifold difficulties and problems in mind, I have endeavored to provide an improved form of plate without necessitating a change in the essential structure of the present type of valve mechanisms.

Another object of my invention is to provide a goggle valve plate whose portions are readily replaceable.

Another object of my invention is to provide a valve plate with a view to the individual requirements of the different portions thereof.

A further object of my invention is to provide a plate that will make possible machined seats on both sides thereof for securing a gas tight seal with the inclined edges of the flanges of its associated valve mechanism.

A further object is to fabricate an inexpensive composite valve plate.

A further object is to provide improved methods of forming and fabricating a valve plate.

A still further object is to fabricate an improved form of valve plate that is simple in design, efficient, positive, and sensitive in operation, and that has longevity under continued use.

These, and many other objects will appear to those skilled in the art from a study of the following description taken in view of the accompanying drawings. And, the specific embodiments of my invention shown for the purposes of illustration include;

Fig. 2 is a sectional end view taken along the line II—II of Fig. 1, and like Fig. 1, shows an embodiment of my invention in mounted position with respect to a valve mechanism.

Figure 1:
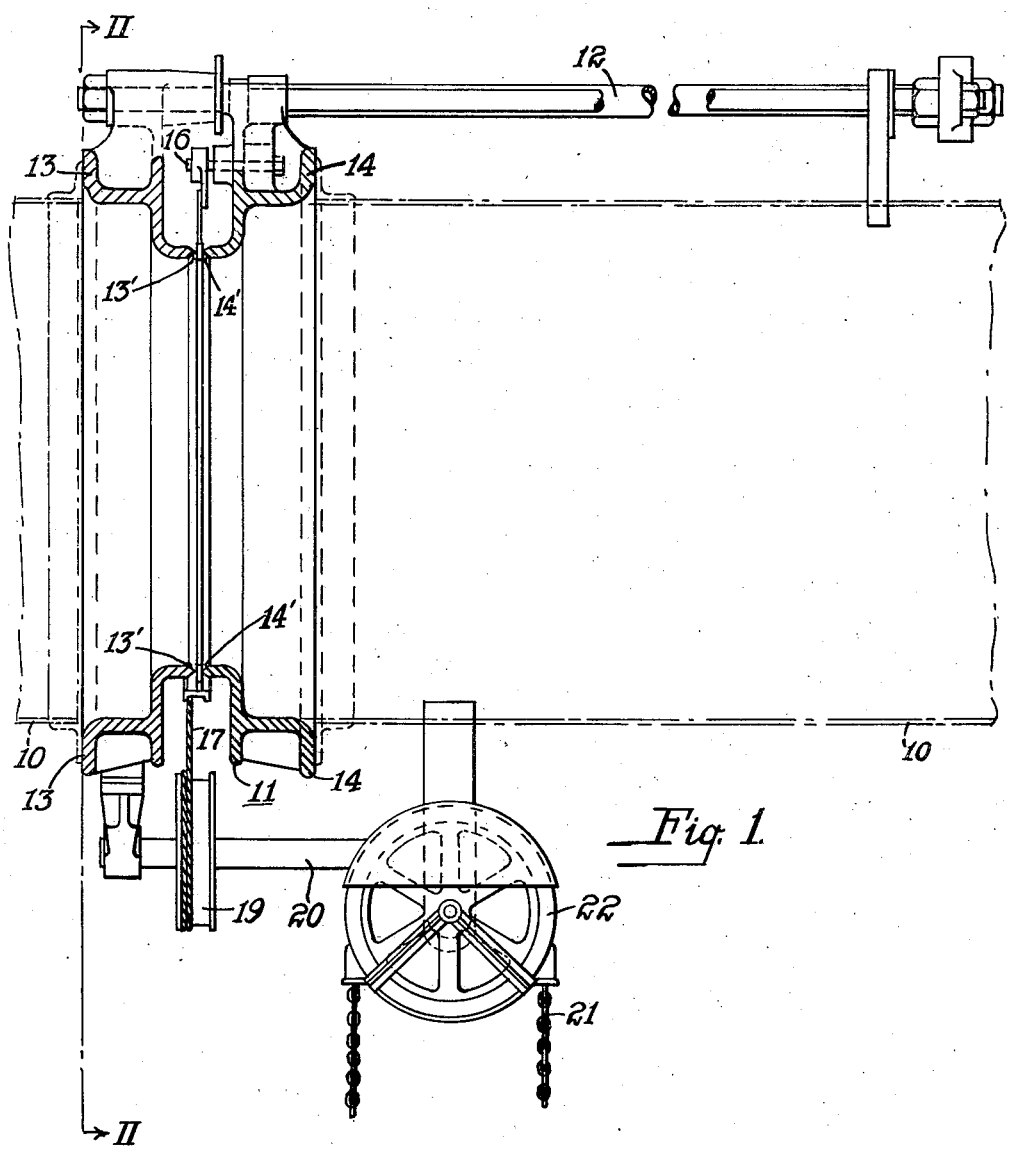
Figure 1 is a longitudinal sectional elevation of a pipe line having an ordinary type of goggle valve mechanism mounted therein.

Fig. 3 is an end or a plane view of an improved form of plate; Fig. 4 is an enlarged sectional view taken on the line IV—IV of Fig. 3; Fig. 5 is a side view taken along the line V—V of Fig. 3; and Fig. 6 is a partial section taken along the line VI—VI of Fig. 3.

Fig. 7 is an end or plan view of another embodiment of my invention; Fig. 8 is an enlarged sectional view taken along the line VIII—VIII of Fig. 7; Fig. 9 is a side view taken along the line IX—IX of Fig. 7; and, Fig. 10 is a partial section taken along the line X—X of Fig. 7.

Fig. 11 is an enlarged sectional view showing still another illustrated embodiment of my invention and is taken along the line XI—XI of Fig. 7.

I have shown several modifications of valve plates for the purposes of illustration, but it must be understood that my invention is not limited to these particular embodiments.

Referring to Fig. 1 of the drawings, 10 designates a pipe line, gas main, or the like, in which a goggle valve 11 is positioned. The valve 11 includes thermal expansion tubes 12 mounted between opposite annular flange portions 13 and 14 whose tapered edges 13' and 14' are machined to form narrow annular valve seats for engaging a goggle valve plate 15 which is pivoted at 16 to the valve 11. When the tubes 12 are heated, they tend to expand or lengthen, and move valve seats 13' and 14' from engagement with the plate 15. When the tubes 12 are cooled they contract or shorten and force the seats 13' and 14' tightly against the plate 15.

In order that the goggle plate 15 may be shifted about the pivot 16 from an open to a closed position, or vice versa, when the tubes 12 are expanded, criss-crossed shifting ropes or cables 17 are provided, the ends of which are fastened in members or posts 18 which are rigidly secured to the upper edges of the plate 15. The members 18 may be formed from suitable portions of small pipe welded to the edges of the plate 15 and in which the ends of the cables or ropes 17 are secured. The ropes or cables 17 are wound around a drum wheel mechanism 19 which is mounted on a suitable shaft 20. A hand chain 21 passing over a chain wheel 22 which is geared to the shaft 20 may be provided for rotating the drum 19 so as to shift the valve plate 15 from one position to the other. The ropes or cables 17 are maintained in position around the edge of the valve plate by a guide member 23 which may be secured thereto in any suitable manner. It will also be noted that the guide member 23, near each end thereof, abuts against the edges or arc surfaces of the rings 25', 25'' or 26', 26'', or 35, 36, or 45', 46 as the case may be. Stops 24 limit the travel of the goggle plate 15 and prevent it from passing beyond its predetermined valvular control position.

In Figs. 3 to 6, inclusive, I have illustrated the goggle plate 15 as constructed in accordance with one embodiment of my invention. In this embodiment the plate 15 is formed from sheet metal which is rolled out to a relatively thin gauge. After the sheet has been rolled to gauge it is cut, sheared, or trimmed off in the shape of a "heart" or "kidney" having two opposite wings or sides 25 and 26 which are of the shape of two circles of like diameter whose arc-shaped edges contact at a common central point. The wing 25 is completely enclosed or shut-off, while the wing 26 has a cut-out portion in the center thereof of substantially the same diameter as the diameter of the valve 11 between the edges 13' and 14' of the annular flanges 13 and 14.

The goggle plate 15 of the embodiment of Fig. 3, the plate 30 of the embodiment of Fig. 7, and the plate 40 of the embodiment of Fig. 11, each has a somewhat fan-shaped plate 27 disposed centrally thereof and slightly above or adjacent to the contact point between the arcs of the wing portions or orbs, and which is pivoted to the valve 11. The plate 27 may be riveted, welded, or rigidly secured to the plate 15 in any other suitable manner.

A suitable channel or angle member formed in or rolled out to an arc-shape is secured to the edges of the lower side of the plate 15 across the wings 25 and 26 and form the guide or carrying rail 23 for the plate shifting cable or rope 17.

From the above construction, it is apparent that the goggle plate 15 may be readily turned about its pivot point 16 so as to move the wing 25 into position between the valve seats 13' and 14' when it is desired to shut off the pipe line 10, or to move wing 26 into position therebetween when it is desired to open the valve 11 and permit flow through the pipe line 10.

In order to provide a leak-proof or gas-tight joint between the plate 15 and the valve seats 13' and 14', rings 25', 25'', 26', and 26'', whose diameter is slightly less than, but substantially corresponds to the circular diameter of each wing 25 and 26, taken between its outer edge and the center of the plate 15 are placed on opposite sides or faces of the plate 15 in adjacent, opposite, and parallel juxtaposition to provide valve-seating surfaces. The rings 26' and 26'' are positioned around the opening in the wing 26 and the rings 25' and 25'' are positioned on the wing 25 so as to be tangent to the rings 26' and 26''. As shown in the drawings, the outer edges of the rings are spaced a short distance back from the edges of the wings 25 and 26.

The rings 25', 25'', 26' and 26'' are formed from bar stock which is rolled to a gauge that may be of the same or greater but is preferably lesser than the gauge of the plate 15. After the bar has been rolled to gauge, it is cut into a number of pieces of proper length, and each piece is then bent into a circular form and the adjacent edges are welded together to form a continuous ring.

The rings 25', 25'', 26', and 26'' form valve-seating surfaces on the plate 15 and are preferably welded thereto along their edges as at "a" and to each other at their point of tangent as at "b". By welding the rings to the plate 15, I have provided a goggle plate having valve-seating surfaces that may be readily removed and changed when the same become worn.

Unlike the rolled plate heretofore used, the outer contacting faces may be machined. Of course, in my present invention, the rings constitute the contacting surfaces or faces and are machined on both sides of the goggle plate 15.

In Figure 6 I have illustrated a preferred form of stop 24. The stops 24 are rigidly secured to the wings 25 and 26 above the posts 18, and each has a portion extending upon the upper seating surfaces of each of the upper rings 25' and 26'. If desired, the stops may be secured to the wings with screw and bolt means, for adjusting purposes. These stops 24 serve to limit the travel of the goggle plate 15 in order that each portion 25 and 26 thereof cannot swing past its predetermined valvular control position. The stops 24 are preferably fixed in position before the rings or rims are machined.

In Figs. 7 to 10, inclusive, I have illustrated a goggle plate, designated as 30, constructed in accordance with a modification of my invention. In this modification, the goggle valve is formed of two rings 35 and 36, the edges of which abut and are secured together. The rings are rolled out to a relatively heavy gauge, bent to a circular or annular form, and welded at adjacent edges to form a continuous solid ring. After the rings have been formed they are placed on a common plane in side-by-side relation with their edges contacting at a common point and being welded together. Plates 37 and 38 of relatively smaller gauge than the rings are then welded between rings 35 and 36 to form the goggle plate. The plate 37 which is triangular in shape, is welded in place between opposite arcs of the rings 35 and 36, and extends upwards from their common contacting point. The plate 38 which is somewhat larger than the plate 37 but of the same thickness is welded in place between the rings opposite the smaller plate 37. Both the upper and the lower plates 37 and 38 serve to further strengthen the bond between the two rings 35 and 36. The plate 37 has a fan-shaped member 39 secured thereto which is pivoted to the valve 11 and permits the goggle plate 30 to be readily moved to its open and shut positions.

In order that the valve 11 will be closed when the goggle plate 30 is moved to one position, a circular plate 35' is fitted into the ring 35 to which it is welded.

After the goggle plate 30 has been assembled and the parts welded together, the opposite faces of the rings 35 and 36 are machined so as to provide valve-seating surfaces on each side of the plate 30.

While I have illustrated the plate 38 as being made up of a plurality of small pieces welded together, it is understood that it may be formed from a single unitary piece, if desired.

The goggle plate 30 is provided with the usual posts 18, cable guide 23 and stops 24.

In Fig. 11 I have illustrated another modification of my goggle plate which is designated as 40. In this modification the goggle plate 40 is formed principally of a circular member or wing 45 and a ring 46 which are arranged so as to lie adjacent each other in a common plane and are welded together at their point of contact.

The circular or annular wing 45 is built up, fabricated, cast, or forged out of a single piece or disc of metal. The center of the section is hogged, tooled, roughly turned, or beveled inwardly from the edges, as at "c", in order to reduce the thickness and weight thereof and leaving a rim 45' of suitable thickness near the edges of the section 45 which forms a valve seat ring. The ring 46 is formed similar to the open rings 35 and 36 of the previous modification.

In all the embodiments of my invention, the opposite wings of cast, fabricated, or forged form, such as 25—26, 35—36, or 45—46, may be broadly designated as circular portions or orbs. These orbs may then be said to include ring and/or disc members or portions.

As in the other modifications, plates are welded between the member 45 and the ring 46 to form the complete goggle plate.

Although the two rings 35—36 or 45—46, as the case may be, can be welded together by a weld "b", at their common point of contact (Fig. 11), they may be merely held in place by the upper and lower plate sections which are welded therebetween (Fig. 8).

In carrying out my invention, especially that modification illustrated in Figs. 7-10, I prefer to form the rings forming the seating surfaces of the valve plate from a heat resisting metal such as chromium-iron alloy, or a chromium-nickel-iron alloy. I have found that an alloy containing approximately 16% chromium and the balance principally iron, or an alloy containing approximately 18% chromium, 8% nickel and the balance iron, has the desired heat resisting properties and that seating rings formed of either of the alloys have a longer life than those formed of other metals.

In the various embodiments of my invention, the rings, plate sections, and the like may be annealed before being welded or secured in position. They are preferably at least annealed after being built up or fabricated into a composite unit, and then, leveled before their seat rings and rims are machined. The annealing tends to alleviate any bad effects of the welding operation upon the metal; also, the rims and rings are subjected to the most wear and should be absolutely true—for that reason annealing is even more important to them.

The welding "a" and "b" is preferably done by the continuous electric method, but other methods of welding as well as securing the parts or sections of the plates 15, 30, and 40 to form a composite member may be advantageously employed. Welding is one of the methods that allows ready replacement of the portions or parts making up the parts.

While I have for the purpose of illustration, specifically mentioned forming the plates of my invention by rolling out or by forging methods, yet it must be understood that they may be fabricated or formed in any other way suitable to the art. As an example, the plates of my invention may be made up of members cast in a single or plurality of sections. The same reasoning applies to the bars employed for seating purposes.

While I have described but a few embodiments of my invention, it will be apparent that many changes, modifications, substitutions, additions and omissions, or combinations thereof may be made in this invention without departing from the spirit and scope thereof as indicated in the appended claims.

What I claim as new and desire to secure by Letters Patent is:

1. As an article of manufacture, a plurality of metallic members rigidly secured together to form a multi-part-unitary goggle valve plate, said plate having at least one all-metal seating surface, said seating surface having a raised relationship with respect to a normal surface plane of said plate, so that said raised surface may be accurately trued up as by machining while the plate is in a unitary form.

2. As an article of manufacture, a goggle valve plate including a plurality of metallic members rigidly secured together to form a unitary plate, said plate having a plurality of valvular seating surfaces, said seating surfaces having a continuous form and having a raised relationship with respect to a normal surface plane of said plate, so that said raised surfaces may be accurately trued up as by machining while the plate is in a unitary form, said seating surfaces being securely welded to and forming a unitary part of said plate.

3. The method of fabricating a goggle or gas valve plate which includes rolling out a plate of suitable thickness, independently rolling out a seat for the plate, welding the seat in proper position against the plate, and machining the seat for giving a leakproof surface thereto.

4. The method of fabricating a valve plate which includes rolling out a plate of suitable thickness, rolling out a bar of somewhat greater thickness, cutting the bar into a plurality of pieces of given length, forming each of the pieces into a ring, securing adjacent ends of each ring together, and welding the rings in place with respect to each other and the plate for providing seats therefor.

5. The method of fabricating a goggle or gas valve plate which includes forming rings of a suitable size and thickness, placing the rings in side-by-side relation on a common plane, forming suitably shaped plate sections, placing the plate sections between adjacent edges of the rings and in abutting relation thereto on opposite sides of the point of contact between rings, and welding the plate sections in place to the edges of the rings abutted.

6. The method of fabricating a composite goggle valve plate which includes rolling out a bar to a given thickness, forming the bar into a number of separate orbs, placing the edges of two orbs in a contacting relationship, securing the contacting arcs of the orbs together, and securing a pivot supporting member to said orbs adjacent their point of contact.

7. The method of fabricating a composite goggle valve plate which includes forming a number of rings of suitable thickness and like diameter, placing two rings in edge to edge relationship and welding the contacting arc portions of the said rings together, forming a channel member and bending said member to conform to an arc, welding the opposite ends of said channel to opposite and like edges of the said two rings, forming a suitable pivot supporting plate member, and subsequently welding said member to the edges of said rings adjacent the contact portions thereof and opposite the channel welded thereto.

8. As an article of manufacture, a goggle-valve plate having in combination, a plurality of orbs securely held together by and at a common point of contact in a side-by-side relation for providing suitable circular seats, one of said orbs being closed off, and means secured between said orbs centrally thereof for pivotally supporting them as a unit.

9. An assembled goggle or gas valve plate having in combination, a plurality of heat resisting rings having their outer peripheries in contact and secured together, means for closing one of said rings, and means secured between said rings opposite their contact point for completely forming said valve plate, said rings being adapted to be machined so as to form valve seats on said plate.

10. The method of fabricating a goggle or gas valve plate which includes placing a pair of rings in side by side relationship, so that their outer peripheries are in contact, welding said rings together, welding a metal section between the outer peripheries of said rings to form a supporting member, and machining said rings for forming seating surfaces.

11. As an article of manufacture, a goggle valve plate having in combination a plurality of substantially flat-circular portions, one portion having means for seating the plate in one position, another portion having means for seating the plate in another position, the last mentioned portion being closed off and the first mentioned portion having a hollow center, said portions having a side by side relationship, and a weld securing said portions together at an edge point of contact.

12. The method of fabricating a composite goggle valve plate which includes rolling out metal to a given thickness, forming the metal into a number of separate substantially flat-circular wing portions, placing the edges of two of said portions in contacting relationship, welding the contacting arcs of said two portions together, and securing a pivot supporting member to said wings adjacent their point of contact.

13. As an article of manufacture, a goggle valve plate having in combination a plurality of separately formed and substantially orbical portions having seating surfaces, one portion having means for seating the plate in one position, another portion having means for seating the plate in another position, the last-mentioned portion being closed off and the first-mentioned portion having a hollow center, said portions being positioned on a common plane and having an edge point of contact, said portions being rigidly secured together at each point of contact, a pivot supporting member secured to said orbs adjacent their point of contact, and a guide member of substantially arcuate form mounted to extend from the edge of one orbical portion to the edge of the other orbical portion for receiving a cable-operating means therein.

14. An article of manufacture, a goggle valve plate having in combination a plurality of separately formed and substantially flat orbical portions having seating surfaces, one portion seating the plate in one position, another portion seating the plate in another position, the last-mentioned portion being closed off and the first-mentioned portion having a hollow center, said portions being positioned on a common plane and having their arcs contacting at a common point, a weld rigidly securing said portions together at said common point of contact, a pivot supporting member mounted between said portions adjacent the common point of contact thereof, each of said orbical portions having a stop portion extending upon the upper seating surfaces thereof for limiting movement of the valve plate about said pivot member.

15. A goggle or gas valve plate, comprising a pair of rings having their outer peripheries in contact and secured together, plates secured between said rings opposite the point of contact thereof, and a plate secured to the inner periphery of one of said rings for closing the same.

16. The method of fabricating a valve plate which includes forming rings of a suitable size and thickness, placing the rings in side-by-side relation on a common plane, forming a suitable circular plate of a diameter corresponding to the inner diameter of a given ring, placing the circular plate in an abutting position between the inner edges of the given ring, forming suitably shaped plate sections, and placing the sections between adjacent edges of the rings and in abutting relation thereto, and welding the circular plate and the plate sections in place to the edges of the rings abutted.

17. The method of fabricating a goggle or gas valve plate which consists in placing a pair of rings side-by-side so that the outer peripheries thereof are in contact, welding said rings together, welding sheet metal sections between the outer peripheries of said rings to form a plate, welding a closing plate in one of said rings, and machining the opposite faces of said rings so as to form seating surfaces.

18. As an article of manufacture, a composite goggle valve plate for hot fluids which includes a plurality of rings having a like diameter and a like thickness, said rings being mounted in an edge-contacting relationship, said edges being welded together, a supporting member, said supporting member being welded to the edges of said rings adjacent the point of contact thereof, an arc-shaped channel mounted to abut against opposite edges of said rings opposite the supporting member thereof, said channel being welded at such mounted position, plates welded between the inner edges of said channel and the corresponding edges of said rings for closing off the space therebetween, a circular disc of lesser thickness than the thickness of said rings having a diameter corresponding to the inner diameter of one of said rings, said disc being welded within the inner circumference of the last-mentioned ring for sealing off the space thereof.

19. A goggle or gas valve plate, comprising a pair of rings formed from heat resisting metal and having their outer peripheries in contact and secured together, plates secured between said rings opposite their contact point, and a plate of heat resisting metal secured to the inner periphery of one of said rings for closing the same.

20. The method of fabricating a goggle valve plate which includes forming a plate of suitable thickness, forming a bar of suitable thickness, cutting the bar into a plurality of pieces of given length, forming each of the pieces into a ring, welding adjacent ends of each ring together, and placing a pair of rings on faces of the plate in opposite and parallel juxtaposition and welding the pair in such position to the plate for providing valve seats therefor.

21. The method of fabricating a goggle valve plate which includes forming a plate of suitable thickness, forming a plurality of bar pieces of given thickness, bending each piece into a ring and welding adjacent ends of each ring together, cutting out a hole in one side of the plate, centering a pair of rings from the hole in one wing of the plate and welding the rings on faces of the plate in opposite and parallel juxtaposition, centering a pair of rings on the other wing of the plate in such a manner that the edges of the first mentioned pair on corresponding faces of the plate have a point of contact, welding the last mentioned pair in like manner to said first mentioned pair of rings, leveling the plate before and after the welding operations have been completed, and subsequently, machining the faces of each pair of rings for providing valve seats.

22. As an article of manufacture, a goggle valve plate having in combination, a plate of given shape having one wing of solid structure and another wing of hollowed-out structure, a pair of rings disposed on opposite faces of the solid wing of said plate for acting as valve seats therefor, and another pair of rings positioned in side-by-side relation with the first mentioned pair and being disposed on opposite faces of the hollow wing for acting as valve seats therefor.

23. The method of fabricating a valve plate which includes forging a plate piece of substantially half the desired size of completed plate, roughly turning out the center thereof and leaving a rim of somewhat greater thickness, shaping said rim on both sides to form a valve seat, forming a ring corresponding in thickness to the rim, and rigidly securing the plate piece in side-by-side relation to the ring, so that a complete plate will be provided.

24. The method of fabricating a goggle valve plate which includes forging out a circular piece of substantially half the size of the plate, beveling out the circular piece centrally on both faces thereof and leaving a rim therearound for a valve seat, forming a ring of a thickness corresponding to the thickness of the rim of the circular plate, placing the ring and circular plate in side-by-side relation, forming suitable plate sections, and welding the plate sections between adjacent edges of the ring and the circular plate, so that a complete valve plate will be provided.

25. As an article of manufacture, a plate for a goggle valve which has in combination, a plurality of separately formed portions, one portion being forged into a solid circular shape having a somewhat beveled out center and a rim therearound for acting as a valve seat therefor, the other portion having a hollow circular shape of a thickness corresponding to the thickness of the rim of the first mentioned portion for acting as a valve seat for the hollow portion.

WILLIAM M. BAILEY.